United States Patent [19]

Friedman

[11] 4,281,923
[45] Aug. 4, 1981

[54] INTERCONNECTED, ADJUSTABLE ZOOM LENS AND RETICLE UTILIZED IN LENS SYSTEMS FOR STEREOPLOTTER

[75] Inventor: S. Jack Friedman, Alexandria, Va.

[73] Assignee: O.M.I. Corporation of America, Alexandria, Va.

[21] Appl. No.: 36,013

[22] Filed: May 4, 1979

[51] Int. Cl.³ ............................................. G01C 11/12
[52] U.S. Cl. ........................................ 356/2; 350/10; 350/136
[58] Field of Search ........................... 356/2, 251, 252; 250/558; 350/10, 136, 138, 184, 187; 355/22, 52

[56] References Cited

U.S. PATENT DOCUMENTS

| Re. 29,194 | 4/1977 | Ambrose et al. | 350/138 X |
|---|---|---|---|
| 2,847,906 | 8/1958 | Santoni | 350/136 |
| 3,116,555 | 1/1964 | Helava | 33/20 D |
| 3,251,283 | 5/1966 | Wood | 355/22 |
| 3,418,034 | 12/1968 | Ambrose | 350/10 X |
| 3,446,553 | 5/1969 | Somazzi | 355/47 |
| 3,450,475 | 6/1969 | Mondon | 355/52 |
| 3,465,444 | 9/1969 | Blachut et al. | 350/136 X |
| 3,486,820 | 12/1969 | Blachut et al. | 355/22 |
| 3,495,891 | 2/1970 | Lee | 356/10 X |
| 3,663,103 | 5/1972 | Collins | 355/22 |
| 3,692,406 | 9/1972 | Blachut et al. | 355/22 |
| 3,732,008 | 5/1973 | Lasalle | 355/22 |
| 3,738,746 | 6/1973 | Lewis et al. | 355/22 |
| 3,879,107 | 4/1975 | Chaban | 350/138 |

Primary Examiner—F. L. Evans
Attorney, Agent, or Firm—Martin P. Hoffman; Mitchell B. Wasson; Geoffrey L. Chase

[57] ABSTRACT

A stereoplotter with carriages and two distinct lens systems for viewing a pair of overlapping aerial photographic transparencies positioned on the carriages to produce a three dimensional optical model visible at the binocular viewer of the stereoplotter. The carriages are independently adjustable in two directions, and respond to both manual and computer control. A floating mark, or reticle, is introduced into the plane of the photographic transparency by each lens system. The operator, by manipulating manual or other controls, moves the floating marks into an apparently fused, or overlapping relationship, and then moves the fused mark along the surface of the optical model to generate a moving trace in X, Y and Z coordinates.

Panoramic aerial photographs have posed significant problems for known stereoplotters, for an overlapping pair of photographs, to be viewed without distortion, required different magnification for each lens system. The different magnifications, however, caused one floating mark, or the other, to change size relative to the amount of magnification and therefore to overlap or obliterate its counterpart so that the Z coordinate of the optical model could not be accurately determined.

The instant invention interconnects the zoom lens and reticle utilized in each lens system in the stereoplotter in such a manner that the magnification of the zoom lens is inversely related to the effective area of the variable area diaphragm, the projected image of which constitutes the floating mark, or reticle. Consequently, if the magnification of the zoom lens is doubled, the effective area of the variable area diaphragm is halved, and vice versa.

5 Claims, 5 Drawing Figures

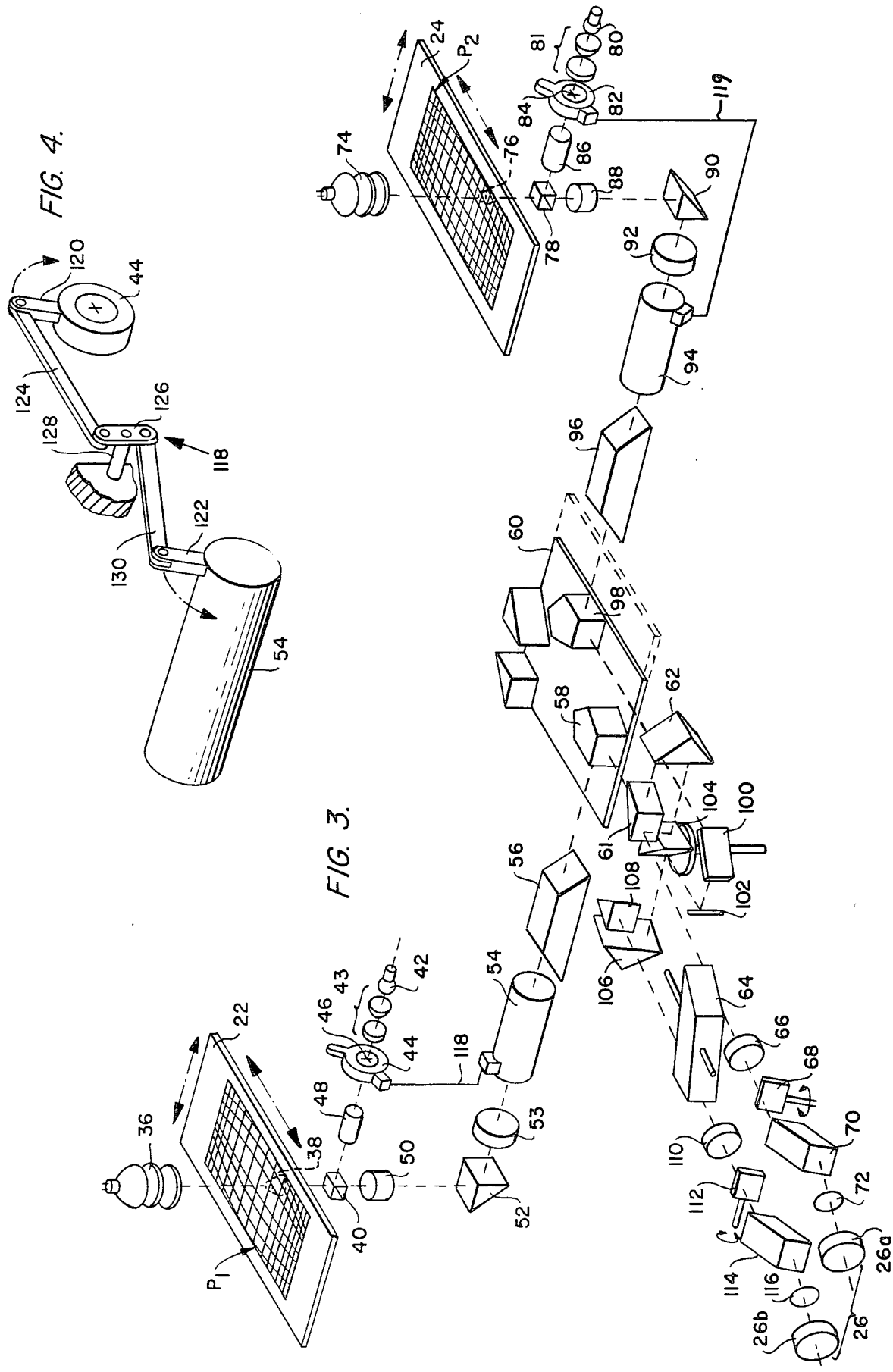

INTERCONNECTED, ADJUSTABLE ZOOM LENS AND RETICLE UTILIZED IN LENS SYSTEMS FOR STEREOPLOTTER

BACKGROUND OF THE INVENTION

1. Field of the Invention

The invention relates generally to lens systems for use in stereoplotters, and more particularly to an adjustable lens system wherein a zoom lens and a reticle, or floating mark, of the lens system are adjustably interconnected in an inverse relationship.

2. Prior Art

Aerial photography has gained widespread acceptance as the most efficient manner of surveying large geographic areas, including terrain that is inaccessible from the ground. The photographs previously were taken in rapid fire, consecutive fashion from a camera mounted in an airplane, with fixed lens and a cone providing a point perspective geometry. The resulting overlapping photographs were subsequently viewed and analyzed stereoscopically. The distortions in the photographs, which are due to the curved surface of the earth, ground elevations, film shrinkage, atmospheric refraction, tilt, tip or swing of the plane, etc., are rectified by diverse optical, mechanical or electrical techniques so that the end product closely approximates an orthogonal projection, or othophotograph.

In recent years, earth satellite devices and extremely high altitude airplanes equipped with panoramic cameras have provided mappers and remote sensing experts with extraordinary high resolution photographs permitting a quantum jump in capability for observing and mapping of the earth's surface. Unfortunately, the panoramic photograph, being a line perspective rather than a point perspective of the older and more conventional type photography, presented to the photogrammetric instrument designer a more complex problem. With point perspective photography of the conventional mapping procedure, homologous images appearing on the overlapping stereoscopic pair of photos, have the same approximate scale, and therefore stereoscopic observation is accomplished binocularly at a fixed common magnification.

In the case of panoramic photography, homologous images can vary considerably in scale. Thus, it is essential in order to obtain satisfactory stereoscopic observation that the binocular observation optics have independent variable magnification for each of the two optical trains.

Stereoplotting instruments are available to accomodate panoramic stereo pairs, such as described in U.S. Pat. No. 3,116,555 granted Jan. 7, 1964, to U. V. Helava. However, this instrument and others of a like nature suffer from a defect which seriously limits the performance of the concept insofar as permitting accurate observation and measurement commensurate with the wealth of data inherent in the photographs.

To view a pair of overlapping photographs, either conventional or panoramic photographs, one photographic transparency is placed on a first translatable carriage and the second photographic transparency is placed on a second carriage. A separate optical train is provided for each carriage, and a binocular viewer is situated at the front of the stereoplotter for viewing the optical model created by the overlapping area of the photographic transparencies. Handwheels or other manual controls enable the operator to adjust a floating dot, or reticle, introduced into the field of each photographic transparency until the pair of dots fuse, or overlap completely, as seen through the binocular viewer.

In order to adjust the floating mark for each photographic transparency, a zoom lens is utilized in each lens system. However, in known stereoplotters, when the zoom lens magnifies the image passing therethrough toward one eyepiece of the binocular viewer, the floating mark is enlarged proportionately. Thus, the floating mark associated with one lens system is much larger than the other floating mark, and difficulty is encountered in causing the marks to fuse. Alternately, the disparities in the sizes of the floating marks causes distortions and errors in the tracing of the optical model. Such shortcomings have retarded the use of panoramic photographic transparencies taken from a satellite or very high altitude airplane as an accurate aerial surveying tool.

SUMMARY

With the inability of known stereoplotters to accurately view overlapping pairs of panoramic photographic transparencies clearly in mind, the instant invention contemplates refinements in the optical system of known stereoplotters so that such instruments can take full advantage of the greater resolution and field of vision of such photographic transparencies.

It is an object of the instant invention to furnish a pair of independent lens systems for viewing the pair of overlapping photographic transparency, each lens system employing a zoom lens that is interconnected with a variable area diaphragm which provides the image for the projection of the floating mark, or reticle. The interconnection produces an inverse relationship, so that when a particular portion of a photographic transparency is enlarged by the zoom lens, the floating mark is decreased to the same extent. Consequently, the floating marks seen through the binocular viewer are identical in size and are easily fused so that the fused mark can be moved quickly and accurately over the contour of the optical model.

It is another object of the present invention to achieve an adjustable, inversely related interconnection between a zoom lens and a variable area diaphragm in each lens system of the stereoplotter in a simple, yet effective manner. The interconnection may be achieved by a mechanical linkage, by an electrically controlled servo-motor, by an optical sensor, or by any suitable combination of such components.

It is another object of the present invention to produce a stereoplotter with two or more optical trains, each train being independently operable and possessing the ability to magnify, or diminish, over wide limits, the size of the projected photographic image and the associated floating mark.

Numerous other objects will occur to the skilled artisan when the accompanying drawings are construed in harmony with the following specification.

BRIEF DESCRIPTION OF THE DRAWINGS

FIG. 3 is a schematic representation of the lens systems employed within the stereoplotter of the system shown in FIG. 1;

FIG. 4 is a perspective view of a mechanical linkage for interconnecting the zoom lens and the variable area diaphragm for the lens systems of the stereoplotter.

DESCRIPTION OF PREFERRED EMBODIMENT

Figure 1:
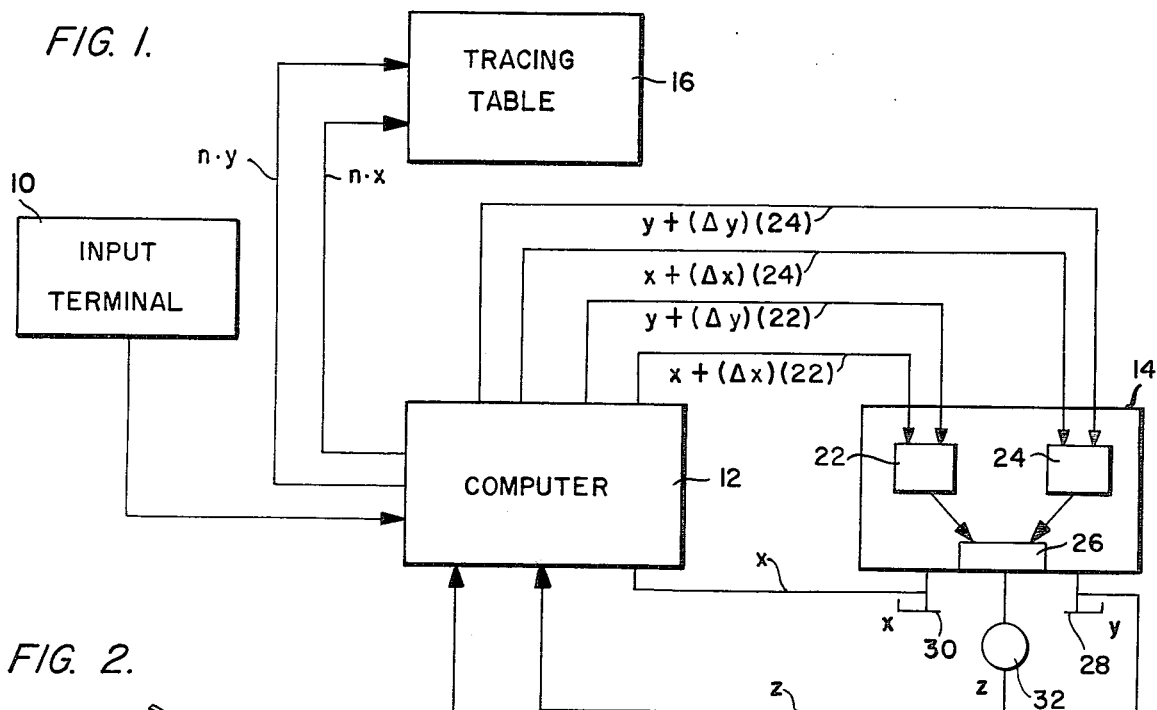
FIG. 1 is a schematic diagram of a known system for producing orthophotographs, such diagram showing the functional interrelationships between a terminal, a computer, a stereoplotter, and a tracing table.

Referring now to the drawings, FIG. 1 schematically represents a known system for producing an orthophotograph. The system includes an input terminal 10 which feeds information into the storage facility of a computer 12, a stereoplotter 14, and a tracing table 16.

The stereoplotter 14 may assume several forms, but the stereoplotter described in U.S. Pat. No. 3,116,555, granted Jan. 7, 1964, to U. V. Helava, is probably the instrument best suited for usage within the system of FIG. 1. The stereoplotter 14 includes a first photocarriage 22 for supporting a first aerial photographic transparency and a second photocarriage 24 for supporting a second aerial photographic transparency of a series of aerial photographs. The photocarriages are independently movable so that the overlapping portions of the aerial photographic transparencies produce a three-dimensional stereoscopic image that is visible through binocular viewer 26. The photocarriages are moved in the X and Y planes by manipulation of handwheels 28 and 30, and a footwheel 32 is manually adjusted by the operator so that the height of the stereoscopic image in the Z plane relative to a datum plane, such as sea level, is given due consideration.

The adjustments of handwheels 28 and 30, and footwheel 32, produce input signals that are fed into computer 12 as indicated by the three lead lines designated x, y, and z, respectively, in FIG. 1. Computer 12 processes the information that has already been inserted therein pertaining to constants for systematic correction of film shrinkage, atmospheric distortion, etc., via input terminal 10 and the input signals from the handwheels and footwheels, and then a series of correctional signals are produced at the output terminals of the computer. Correctional signals $x+(\Delta x)$ and $y+(\Delta y)$ (22) are transmitted to the X and Y servo-motors (not shown) that accurately position the first photocarriage 22; related correctional signals $x+(\Delta x)$ (24) and $y+(\Delta y)$ (24) are transmitted to the X and Y servo-motors (also not shown) that accurately position the second photocarriage 24. Correctional signals, multiplied by a scale factor of n, are also transmitted to the stylus (not shown) or tracing table 16 to drive same.

Figure 2:
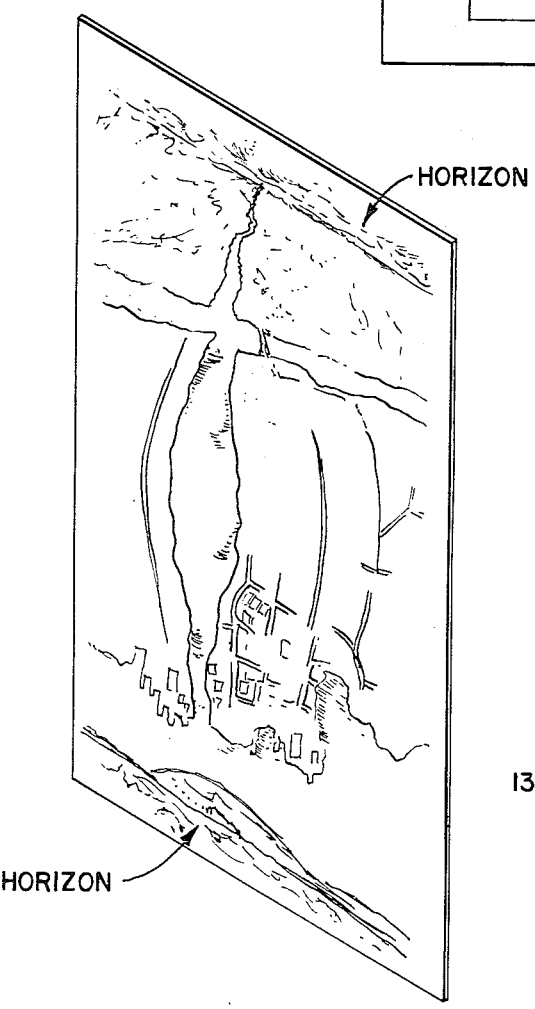
FIG. 2 is a perspective view of a transparency of a panoramic photograph.

FIG. 2 is a representation of an aerial photographic panoramic transparency of a view taken with a lens that spans an area from horizon to horizon, as indicated at opposite ends of the transparency. Such transparency exhibits a variable geometric characteristic. The grid lines suggest that the clarity of the image is greatest near the center of the picture, and that the distortion increases outwardly therefrom for the transparency is an attempt to represent the curved surface of the earth in two dimensions.

The novel aspects of the invention, however, do not reside in the overall system of FIG. 1, however, but are present within the optical system of the stereoplotter, as shown in FIG. 3, which functions to remove the distortions of the transparency of FIG. 2, while enjoying the advantages of higher resolution and greater coverage per transparency. FIG. 3 shows the first photocarriage 22, the second photocarriage 24, and the binocular viewer 26 of the stereoplotter 14 shown in FIG. 1 in greater detail. The housing that encases the various components of the lens system has been omitted for the sake of clarity and, as will become evident from the following description, the stereoplotter employs two distinct but similarly constituted lens systems to present an apparent, three-dimensional optical model to the operator at binocular viewer 26.

The photocarriage 22 is formed of transparent material, such as glass, and one aerial photographic transparency $P_1$ of a pair of overlapping panoramic photographic transparencies is positioned thereon. The photocarriage 24 is identical in shape and operation, and the second aerial photographic transparency $P_2$ of the pair is positioned thereon. The photocarriages 22, 24 are translated in the X and Y directions, by servo-mechanisms (not shown), controlled by correction signals from computer 12. The movement of the photocarriages is suggested by the directional arrows shown adjacent thereto in FIG. 3.

A first light source 36 shines directly through a selected area of the panoramic transparency $P_1$ positioned in photocarriage 22, and the image passes through a conical element 38 positioned beneath photocarriage 22 onto the rear face of a semi-silvered cube 40. A second, smaller light source 42 produces a beam of light that passes through a condensing lens pair 43 and thence through a variable area diaphragm 22. The projected image of the variable diaphragm 44 constitutes the reticle 46 that is projected through a microscope objective lens or reducing lens 48 onto the front face of cube 40, whereupon the reticle is combined with the image of the illuminated area of the transparency $P_1$ in the same plane.

The combined image then passes through a cylindrical lens 50, a 45° prism 52, an objective lens 53, and a zoom, or variable magnification lens 54. An Amici or Dove prism 56 for rotating the entire field is situated next to zoom lens 54, and a multi-faceted prism 58 is secured to adjustable platform 60. The combined image, after traveling through prism 58, continues on through prism 61, is reflected through prism 62, travels through a different portion of prism 61, and then passes through pivotally mounted prism 64, objective lens 66, half-silvered mirror 68, prism 70, lens 72 and exits the optical system at ocular, or right hand eyepiece, 26a. The foregoing lens system thus magnifies, reduces, laterally reverses, bends and otherwise manipulates the combined image so that selected portions of the transparency $P_1$ positioned on photocarriage 22 at the left hand side of stereoplotter 14 is visible to the right eye of the operator.

Similarly, a separate lens system is provided for transmitting the combined image of a selected portion of transparency $P_2$ and a floating mark, or reference point, to the ocular, or left side eyepiece, 26b. More specifically, a second light source 74 shines directly through a selected area of panoramic photographic transparency $P_2$ positioned on photocarriage 24, and the images pass through conical element 76 onto the rear face of semi-silvered cube 78. A second, smaller light source 80 produces a beam of light that passes through a condensing lens pair 81 and thence through a variable diaphragm 82. The image of diaphragm 82 is the reticle, or floating mark, 84, which is projected through a cylindrical objective lens 86 onto the front face of cube 78, whereupon the reticle is combined with the image of the illuminated area of the transparency P2, in the same plane.

The combined image then passes through a cylindrical lens, a 45° prism, an objective lens 92, and a zoom, or variable magnification, lens 94. An Amici or Dove prism 96 for rotating the entire field is situated next to zoom lens 94, and a multi-faceted prism 98 is secured to the adjustable platform 60. The combined image, after traveling through prism 98, passes through prism 62, reflects off angularly oriented mirrors 100, 102, passes through ortho-pseudo prism 104, through prisms 106, 108 and then through pivotally mounted prism 64. The combined image continues through objective lens 110, half-silvered mirror 112, prism 114, lens 116, and exits the lens system at ocular, or left hand eyepiece 26b. The foregoing lens system thus magnifies, reduces, laterally reverses, bends, and otherwise manipulates the combined image so that the transparency P2 positioned on photocarriage 24 at the right hand side of stereoplotter 14 is visible to the left eye of the operator.

The variable area diaphragm 44 of the first lens system is joined to the zoom lens 54 by a mechanical linkage 118. Similarly, the variable area diaphragm 82 of the second lens system is joined to the zoom lens 94 by a mechanical linkage 119. The linkages are designed to perform an inverse function, for as the effective magnification of the zoom lens increases the effective light transmitting area of the variable diaphragm is reduced proportionately. Unless such inverse relationship is maintained, one or the other of the floating marks, or reticles, would be magnified relative to its companion reticle. Consequently, the operator can now properly focus the images of the floating reticles 46, 84 until they fuse into a single point capable of tracing the height or Z dimension or contour, of the optical model formed by the projection of the pair of overlapping aerial photographic transparencies $P_1$ and $P_2$.

FIG. 4 depicts the details of the mechanical linkage 118 for maintaining the inverse relationship between the zoom lens 54 and the variable area diaphragm 44 of the first optical system. An ear 120 projects upwardly from the rim of diaphragm 44, and a similar ear 122 projects upwardly from the rim of diaphragm 44, and a similar ear 122 projects upwardly from the zoom lens 54. A first link 124 is secured at one end to ear 120 and at its opposite end to crank 126. A shaft 128 is secured at one end to a fixed support surface, and the crank can be pivoted, at its midpoint, about the shaft. A second link 130 is secured at one end to ear 122 on zoom lens 54 and at its opposite end to crank 126. As suggested by the directional arrows, when ear 122 on zoom lens 54 is rotated in a counterclockwise manner, the diaphragm 44 is rotated in a clockwise manner, and vice versa. A similar mechanical linkage 119 interconnects the zoom lens 94 and variable diaphragm 82 of the second lens system of the stereoplotter 14.

Figure 5:
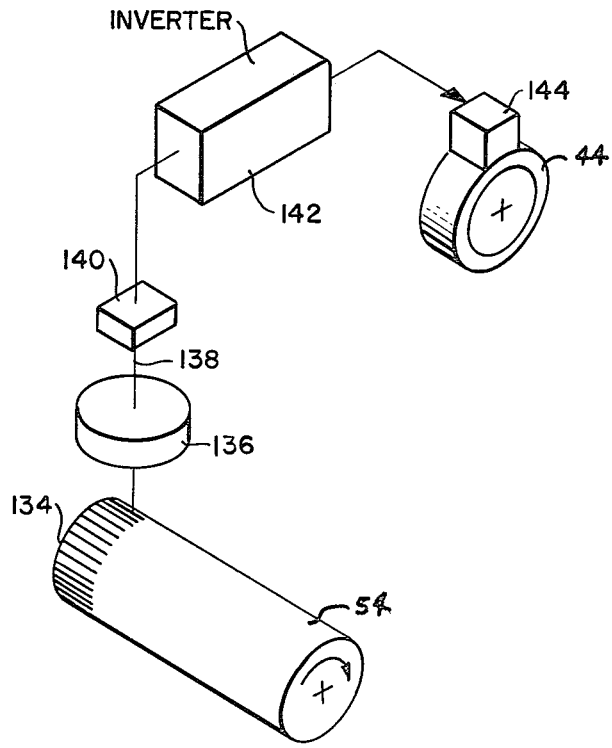
FIG. 5 is a schematic view of another mechanism for interconnecting the zoom lens and the variable area diaphragm for the lens systems of the stereoplotter.

FIG. 5 suggests an alternative manner for maintaining the inverse relationship between the zoom lens 54 and the variable aperture of diaphragm 44. A series of gradations 134 may be spaced around the periphery of zoom lens 54, and one gradation may be employed to define a home position. When the zoom lens is rotated relative to its home position, an optical read head 136 counts the gradations and converts the optical impulses into electrical signals which are fed via line 138 to counter 140 and thence to inverter 142. The inverter, in turn, drives a servo-motor 144 in the direction opposite to the motion of zoom lens 54. A code may be utilized in lieu of gradations 134 in order to detect the extent of movement of zoom lens 54 as well as the sense of its rotation, i.e., clockwise or counterclockwise.

SUMMARY OF OPERATION

Although the operation of the stereoplotter 14, and the related components of the system shown in FIG. 1 has been described previously, a brief summary of the operation of the stereoplotter 14 will serve to highlight the unique aspects of the inversely-related, adjustable zoom lens-reticle interconnection employed in the optical system for each eyepiece of the binocular viewer 26. A pair of overlapping transparencies $P_1$ and $P_2$ are positioned upon photocarriage 22, 24, and handwheels 28, 30, are manipulated until the overlapping images form an optical model visible to the operator through binocular viewer 26. The X and Y coordinates associated with the optical model are then fed into the computer 12, and the computer, utilizing known data stored therein, produces correction signals that are fed to the translating mechanisms for the photocarriages. The photocarriages are automatically adjusted to compensate for the various distortions encountered with aerial photographs.

With the corrected optical model in view, the operator then attempts to adjust the floating marks 46, 84 associated with the pair of lens systems utilized in stereoplotter 14 so that the marks appear to fuse. The fused floating mark acts as a tracer, and in conjunction with the footwheel 32, is manipulated to follow the contour of the optical model and thus measure the height, or Z, dimension of the optical model.

While this practice was most successful when dealing with aerial photographs taken by a plane flying at a fixed altitude and with a definite heading, the use of high flying satellites equipped with panoramic cameras and significant diversity in orientation between successive photographs, such procedure proved to be inadequate. The problem proved not to be in the photographs taken from the satellites, which photographs enabled high resolution, panoramic views, but in the lens system for viewing same. More precisely, when the magnification of the zoom lens operatively associated with one ocular was altered in an effort to remove the distortions attributable to the variable geometry of the aerial photographic transparencies taken from a satellite, the reticle would be altered in the same manner. The pair of reticles observed separately through the oculars 26a, 26b of binocular viewer 26 could not then be brought into proper, fused focus to define a single reference point. The inverse relationship between the zoom lens and the reticle for each lens system of stereoplotter 14 overcomes the previous problems associated with aerial photographic transparencies taken from satellites and takes full advantage of the potential advantages of high resolution, panoramic photographs. Furthermore, such advantages are attainable with but minor modification to the lens system of known stereoplotters.

Obviously numerous other optical, mechanical and electromechanical mechanisms could be employed to produce the desired, adjustable, inverse relationship between the zoom lens and the reticle in each lens system operatively associated with the binocular viewer of the stereoplotter 14. The same adjustable, inverse relationship might find application in other binocular viewing instruments. Also, the same principles could be employed in a stereoplotter utilizing three photocarriages or stages. Consequently, the appended claims should be construed broadly, in a manner commensurate with the scope of the invention, and should not be limited to their exact, literal terms.

I claim:

1. A stereoplotter for viewing pairs of aerial photographic transparencies comprising, in combination,
   (a) a binocular viewer,
   (b) a first photocarriage for supporting the first one of a pair of panoramic photographic transparencies having inherent distortions,
   (c) means for translating said first photocarriages along a first and a second axis,
   (d) a second photocarriage for supporting the second one of a pair of panoramic aerial photographic transparencies having inherent distortions,
   (e) means for translating said second photocarriage along in a first and a second axis, said axes being parallel to the axes within which said first photocarriage is translated,
   (f) a first light source positioned above the first photocarriage to illuminate selected portions thereof and project images from the transparency supported thereon,
   (g) first means for producing a first reference mark and projecting same into the plane of the images projected from the first photocarriage,
   (h) a first lens system including a first zoom lens for transferring the combined image of the first transparency and the first reference mark to one ocular of the binocular viewer,
   (i) a second light source positioned above the second photocarriages to illuminate selected portions thereof and project images from the transparency supported thereon,
   (j) second means for producing a reference mark and projecting same into the plane of the image projected from the second photocarriage,
   (k) a second lens system including a second zoom lens for transferring the combined image of the second transparency and the second reference mark to the other ocular of the binocular viewer,
   (l) the improvement comprising:
      (1) first interconnecting means for joining said zoom lens in said first lens system to said first means for producing a first reference mark in an inverse relationship so that as the power of the zoom lens is increased the size of the first reference mark is diminished proportionately, and
      (2) second interconnecting means for joining said zoom lens in said second lens system to said second means for producing a second reference mark in an inverse relationship so that as the power of the zoom lens is increased the size of the second reference mark is diminished proportionately, whereby the pair of reference marks seen through the binocular viewer can be fused to provide a unitary reference point.

2. The stereoplotter as defined in claim 1 wherein said first means for producing a first reference mark and projecting same includes a first variable area diaphragm, and said first interconnecting means comprises a mechanical linkage extending between said first zoom lens and said first variable area diaphragm.

3. The stereoplotter as defined in claim 1 wherein said second means for producing a second reference mark and projecting same includes a second variable area diaphragm, and said second interconnecting means comprises a mechanical linkage extending between said second zoom lens and said second variable area diaphragm.

4. The stereoplotter as defined in claim 1 wherein said first means for producing a first reference mark and projecting same includes a first variable area diaphragm, and said first interconnecting means includes a first servo-mechanism.

5. The stereoplotter as defined in claim 1 wherein said second means for producing a second reference mark and projecting same includes a second variable area diaphragm, and said second interconnecting means includes a second servo-mechanism.

* * * * *